US009491669B1

(12) United States Patent
Hajj-Ahmad et al.

(10) Patent No.: US 9,491,669 B1
(45) Date of Patent: Nov. 8, 2016

(54) SELECTIVE RATE-ADAPTATION IN VIDEO TELEPHONY

(71) Applicant: QUALCOMM Incorporated, San Diego, CA (US)

(72) Inventors: Ibrahim Hajj-Ahmad, San Diego, CA (US); Vikram Singh, San Diego, CA (US); Gary Chia-Jui Chang, San Jose, CA (US); Jyotirmoy Das, San Diego, CA (US); Tien-Hsin Lee, San Diego, CA (US); Sanjeev Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/830,541

(22) Filed: Aug. 19, 2015

(51) Int. Cl.
*H04N 7/14* (2006.01)
*H04W 36/00* (2009.01)
*H04L 12/825* (2013.01)

(52) U.S. Cl.
CPC .......... *H04W 36/0055* (2013.01); *H04L 47/25* (2013.01); *H04N 7/147* (2013.01)

(58) Field of Classification Search
CPC ........ H04N 7/14; H04N 7/141; H04N 7/147; H04N 19/99; H04N 19/107; H04W 36/0005; H04W 36/00
USPC ........... 348/14.01–14.16; 370/329, 331, 332; 455/436
See application file for complete search history.

(56) References Cited

U.S. PATENT DOCUMENTS

| 8,259,565 | B2 | 9/2012 | Yang et al. | |
| 2010/0208668 | A1* | 8/2010 | Dumazy | H04N 7/147 370/329 |
| 2012/0135734 | A1 | 5/2012 | Ma et al. | |
| 2012/0184277 | A1 | 7/2012 | Hiltunen et al. | |
| 2013/0308620 | A1* | 11/2013 | Bharadwaj | H04W 40/02 370/338 |
| 2014/0036667 | A1* | 2/2014 | Balasubramanian | H04W 28/0231 370/230 |
| 2014/0066072 | A1* | 3/2014 | Carlsson | H04W 36/0061 455/436 |
| 2014/0118462 | A1* | 5/2014 | Zhao | H04W 76/022 348/14.02 |
| 2014/0362160 | A1 | 12/2014 | Jayaraman et al. | |
| 2015/0163811 | A1* | 6/2015 | Konstantinou | H04W 76/026 370/329 |
| 2015/0222390 | A1* | 8/2015 | Yang | H04N 7/15 348/14.08 |

FOREIGN PATENT DOCUMENTS

| KR | 100729145 B1 | 6/2007 |
| WO | WO-2010100315 A1 | 9/2010 |

OTHER PUBLICATIONS

Goel N., et al., "A New Scheme for Network Selection in Heterogeneous Wireless Network using Fuzzy Logic," International Journal of Computer Applications, Feb. 2014, vol. 88 (3), pp. 1-5.

* cited by examiner

*Primary Examiner* — Melur Ramakrishnaiah
(74) *Attorney, Agent, or Firm* — Knobbe Martens Olson & Bear, LLP

(57) ABSTRACT

A system and method for rate-adaptation of a video telephony (VT) session is disclosed. In one example, there is provided a method that includes receiving a first information set indicative of a start of a handover of a device from a first Radio Access Technology (RAT) to a second RAT. The method further includes receiving a second information set indicative of an end of the handover. The method further includes adjusting a rate-adaptation protocol for the VT session based at least in part on the first and second information sets.

30 Claims, 4 Drawing Sheets

SELECTIVE RATE-ADAPTATION IN VIDEO TELEPHONY

TECHNICAL FIELD

The disclosure relates to video telephony (VT) and, more particularly, to techniques for rate-adaptation during a VT session.

BACKGROUND

Communication devices, such as mobile phones, may include an audio capture device, such as a microphone or speech synthesizer, an audio encoder to generate audio packets (or frames), a video capture device, such as a camera, and a video encoder to generate video frames. The video frames may be transmitted between devices for use in video telephony (VT). The communication device (i.e., VT device) may use communication protocol layers, such as real-time transport protocol (RTP), radio link protocol (RLP), medium access control (MAC), and physical (PHY) layers. In a video telephony application, the communication device may place video and audio RTP packets in a RLP queue. A MAC layer module may generate MAC layer packets from contents of the RLP queue. The MAC layer packets may be converted to PHY layer packets for transmission across a communication channel to another communication device. In this context, there remains a need for selective rate-adaptation for VT depending on channel conditions and handovers between different radio access technologies (RATs).

SUMMARY

The systems, methods and devices of this disclosure each have several innovative aspects, no single one of which is solely responsible for the desirable attributes disclosed herein.

In one aspect, there is provided a method for rate-adaptation of a video telephony (VT) session that includes: receiving a first information set indicative of a start of a handover of a device from a first Radio Access Technology (RAT) to a second RAT; receiving a second information set indicative of an end of the handover; and adjusting a rate-adaptation protocol for the VT session based at least in part on the first and second information sets.

In another aspect, an apparatus for rate-adaptation of a VT session comprises a receiver configured to receive a first information set indicative of a start of a handover from a first RAT to a second RAT and further configured to receive a second information set indicative of a an end of the handover. The apparatus further comprises a processor configured to adjust a rate-adaptation protocol for the VT session based at least in part on the first and second information sets.

In another aspect, a non-transitory computer readable storage medium contains instructions that, when executed, cause a processor of a device to receive, during a VT session, a first information set indicative of a start of a handover of a device capable of performing VT from a first RAT to a second RAT and further receive a second information set indicative of an end of the handover. The instructions, when executed, further cause the processor to adjust a rate-adaptation protocol for the VT session based at least in part on the first and second information sets.

In another aspect, there is provided a video coding device for rate-adaptation of a VT session that includes means for receiving a first information set indicative of a start of a handover of the device from a first RAT to a second RAT, means for receiving a second information set indicative of an end of the handover, and means for adjusting a rate-adaptation protocol for the VT session based at least in part on the first and second information sets.

DETAILED DESCRIPTION

This disclosure relates to video telephony (VT) and, more particularly, to techniques for rate-adaptation during a VT session. VT generally refers to real-time communication that includes both video and audio, as opposed to traditional telephony which is audio only. During a VT session, communication devices at different locations transmit and receive packets carrying audio and video data over a network such as the internet.

VT requires high bandwidth compared to other applications. Because of this, carriers off-load video traffic when possible. For example, carriers require off-loading video traffic from Long-Term Evolution (LTE) to Wi-Fi when available to reduce load on the wireless network and/or the network backbone. However, major problems in video quality and user experience may result from the handover between a first radio access technology (RAT) and a second RAT. These problems may be caused by unnecessary rate-adaptation resulting in video quality reduction in response to temporary and often minor reductions in channel conditions during the handover.

Figure 1:
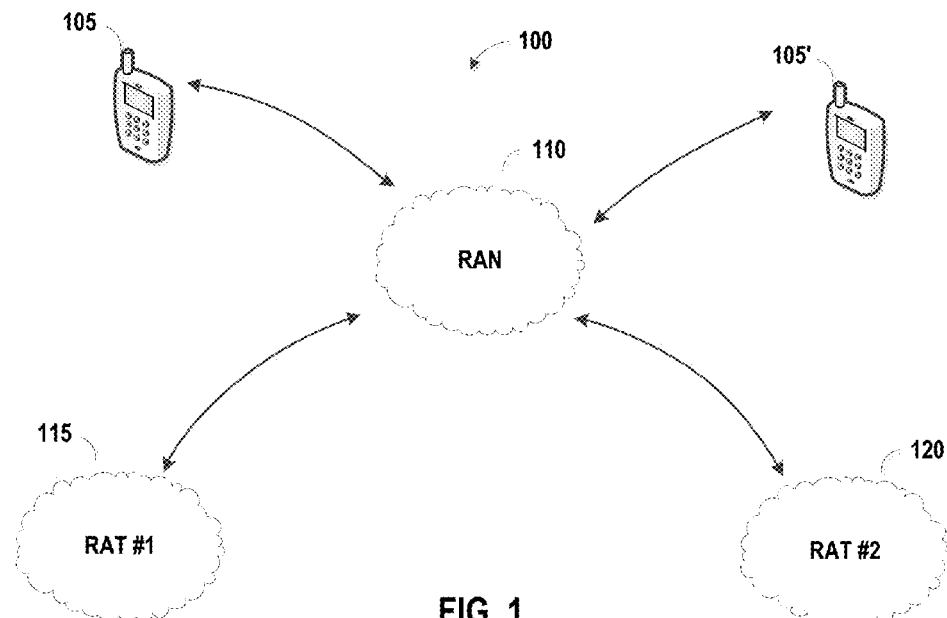
FIG. 1 illustrates an exemplary system with a VT device.

FIG. 1 illustrates an exemplary system with VT devices. In an embodiment, a VT device 105 may communicate bi-directionally with another VT device 105' via one or more networks 110. For example, a network 110 may be a Radio Access Network (RAN). The one or more networks may implement one or more RATs 115, 120. A RAT is an underlying physical connection method for a RAN. Examples of RATs may include Bluetooth, Wi-Fi, 3G, 4G, LTE, LTE Advanced, 5G, etc. For example, a first RAT 115 may be LTE and a second RAT 120 may be Wi-Fi. During the course of a VT session, a VT device 105 may switch from one RAT to another. For example, a VT device 105 communicating via LTE may switch to Wi-Fi when it enters the range of a Wi-Fi router.

A VT device 105 may use video rate-adaptation (e.g., controlling the encoding rate of source video) during a VT session. For example, the video source encoding rate may be reduced due to varying channel conditions, packet loss, jitter, excessive packet loss or delay, or excessive video content or complexity. However, during certain periods (e.g., a transition period between a first RAT 115 and a second RAT 120) it may be advantageous to change the behavior of rate-adaptation. For example, during a transition from LTE to Wi-Fi, a VT device may briefly experience poor channel conditions. However, because the transition is only temporary, rate-adaptation suitable for longer-lasting, poor channel conditions may be unnecessary and/or unsuitable for such transitions. For example, channel conditions during a brief transition may be much worse than channel conditions after the transition, which may result in a lowered bit rate during the transition that may continue after the transition is over, causing poor video quality after the transition. Thus, it may be advantageous to prevent and/or modify the behavior of rate-adaptation during the transition period in order to optimize multimedia user experience by taking advantage of the information on the transition from the modem layer.

Some embodiments may be suitable for use with various multimedia services over Internet Protocol (IP), for example, IP Multimedia Subsystem (IMS). IMS generally refers to an architectural framework for delivering IP multimedia services. Such services include voice and/or video (e.g., Voice over IP (VOIP), Skype, etc.). IMS may involve utilizing Internet Engineering Task Force (IETF) protocols (e.g., Session Initiation Protocol (SIP)) to ease integration with the internet.

VT Devices

Figure 2:
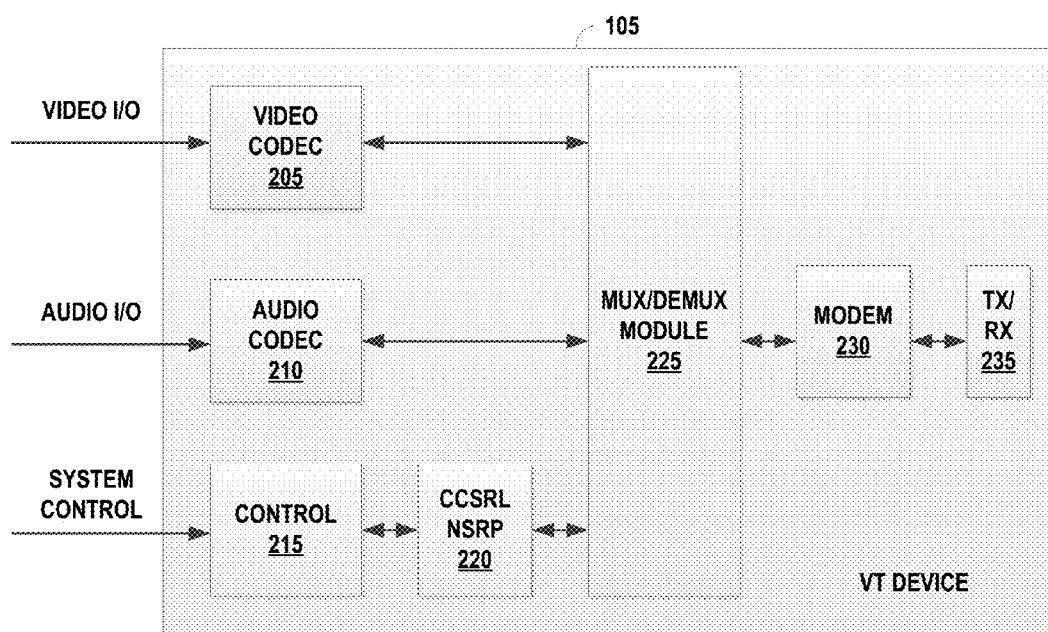
FIG. 2 is a block diagram illustrating an exemplary embodiment of a mobile terminal 200 configured for video telephony.

FIG. 2 is a block diagram illustrating an exemplary embodiment of a VT device 105, which may be a mobile terminal, user equipment (UE), or access terminal (AT) configured for VT. As used herein, a combined video encoder-decoder may be referred to as a "CODEC." The VT device 105 may be equipped to preemptively resend call setup packets, such as numbered simple retransmit protocol (NSRP) packets, when space is available in the modem layer, as described herein. In the example embodiment of FIG. 2, VT device 105 includes a video CODEC 205, an audio CODEC 210, a control layer module 215, a multiplexer-demultiplexer (MUX-DEMUX) layer module 225, a modem 230, a transmit-receive (TX/RX) interface 235, and a control channel segmentation and reassembly layer (CCSRL)-NSRP module 220. Together, these components may form an IMS protocol stack. In general, many aspects of the techniques described herein may be implemented in modem 230 of VT device 105.

Video CODEC 205 encodes video data obtained from a video input device, such as a camera or video archive source, according to an industry standard video compression protocol such as MPEG-4, ITU H.263, H.264, or H.265 (i.e., High Efficiency Video Coding (HEVC)), for transmission to another VT device 105'. In addition, video CODEC 205 decodes video data received from another VT device 105' for output on a video output device, such as a display. Similarly, audio CODEC 210 encodes audio data received from an audio input device, such as a microphone or audio archive source, according to one or more audio compression protocol(s). Audio CODEC 210 also decodes audio data received from a remote terminal for presentation by an audio output device, such as a built-in or external speaker associated with VT device 105.

A control layer module 215 generates messages for transmission to a remote VT device 105' for video call setup, and handles messages received from the remote VT device 105'. For example, messages may be transmitted using various protocols, such as H.245 and/or SIP (e.g., with IMS). Messages may also be transformed from one protocol to another (e.g., H.245 to SIP). CCSRL-NSRP module 220 segments the messages from the control layer module 215 into NSRP packets for transmission to the remote VT device 105', and reassembles received NSRP packets into messages for handling by the control layer module 215. Hence, the call control messages may be divided into segments for NSRP packetization. In general, video CODEC 205, audio CODEC 210 and control layer module 215 reside within an adaptation layer of VT device 105, and pass respective packets to the MUX-DEMUX layer module 225.

The MUX-DEMUX layer module 225 multiplexes packets received from video CODEC 205, audio CODEC 210 and the control layer module 215 into MUX protocol data units (PDUs), and passes the MUX PDUs to modem 230 for modulation and transmission to the remote VT device 105' via TX/RX interface 235. TX/RX interface 235 includes a wireless transmitter and wireless receiver configured for wireless communication according to any of a variety of different communication techniques, such as code division multiple access (CDMA), wideband CDMA (WCDMA), time division multiple access (TDMA), or frequency division multiple access (FDMA), for communication over a wireless communication channel.

Modem 230 may segment and encapsulate the MUX PDUs in integrated services digital network (ISDN) packets, which are then transmitted by TX/RX interface 235 in a series of radio link control (RLC) PDUs. Packets may also be transmitted using SIP and/or may be transformed to SIP for use in IMS. Each MUX PDU passed by MUX/DEMUX module 225 carries NSRP packet information. Once call setup is complete, each MUX PDU will also include video and audio information. During call setup, however, there typically will be no video and audio information passed from the adaptation layer. Accordingly, each MUX PDU will contain predominantly NSRP packet information during call setup. MUX-DEMUX layer 225 also demultiplexes packets received from the remote VT device 105' for processing by video CODEC 205, audio CODEC 210 and H.245 control layer module 215.

The techniques described herein may be implemented within a general purpose microprocessor, digital signal processor (DSP), application specific integrated circuit (ASIC), field programmable gate array (FPGA), or other equivalent logic devices within a VT device 105. Accordingly, various components, such as video CODEC 205, audio CODEC 210, control layer module 215, MUX-DEMUX layer module 225, and modem 230, may be implemented as fixed or programmable features executing within one or more logic devices. Various aspects of the techniques described herein may be implemented in hardware, software, firmware, or any combination thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like.

Figure 3:
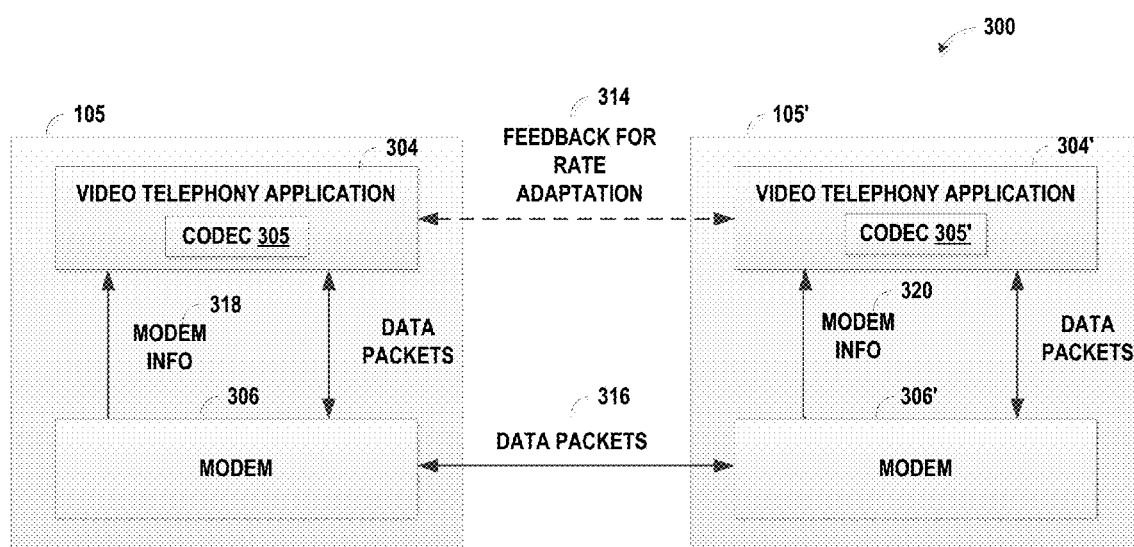
FIG. 3 is a block diagram conceptually illustrating two devices 302 and 308 in VT communication utilizing modem information based rate-adaptation in accordance with aspects of the present disclosure.

FIG. 3 is a block diagram conceptually illustrating two VT devices 105 and 105' in VT communication utilizing modem information based rate-adaptation in accordance with aspects of the present disclosure. The VT device 105 includes a video telephony application 304 and a modem 306. The video telephony application 304 may be stored in a suitable storage medium (e.g., a computer-readable medium) of the VT device 105. In an aspect of the disclosure, the video telephony application 304 includes a video codec 305 for performing decoding and/or encoding of digital video. In some aspects of the disclosure, the video codec 305 may be implemented in software, hardware, or a combination of hardware and software. The VT device 105' also includes a video telephony application 304' and a modem 306'. Therefore, the VT device 105 and VT device 105' may perform VT communication. The video telephony application 304' also includes a video codec 305' that can support the video decoding/encoding scheme used by the video codec 305. In some aspects of the disclosure, the video codec 305' may be implemented in software, hardware, or a combination of hardware and software.

When the VT devices 105 and 105' are in VT communication, end-to-end feedback information 314 may be exchanged between the VT devices while payload data packets 316 (e.g., video frames) are transferred between the applications 304 and 304' via the modems 306 and 306'. Further, the video telephony application 304 receives modem information 318 from the modem 306 such that the video telephony application 304 can detect congestion in the uplink or downlink channel and also determine or estimate the available bandwidth for VT communication, independent of the end-to-end feedback information 314 received from the VT device 105'.

Audio-Visual Profile with Feedback (AVPF)

Real-time media streams that use Real-time Transport (RTP) are, to some degree, resilient against packet losses. Receivers may use the base mechanisms of the Real-time Transport Control Protocol (RTCP) to report packet reception statistics and thus allow a sender to adapt its transmission behavior in the mid-term. This is the sole means for feedback and feedback-based error repair (besides a few codec-specific mechanisms). Audio-Visual Profile with Feedback (AVPF) is an extension to the Audio-Visual Profile (AVP) that enables receivers to provide, statistically, more immediate feedback to the senders and thus allows for short-term adaptation and efficient feedback-based repair mechanisms to be implemented. It does this by providing new mechanisms/signals for immediate feedback to the sender without waiting for a scheduled RTCP interval. AVPF maintains the AVP bandwidth constraints for RTCP and preserves scalability to large groups.

AVPF implements rules controlling the timing of feedback messages to avoid congestion through network flooding by RTCP traffic. The signaling setup for AVPF allows each individual type of function to be configured or negotiated on an RTP session basis.

AVPF is a Request for Comments (RFC) standard that may be used in IMS systems during a VT session. The AVPF specification standardizes all feedback message formats and expected behavior so that a UE made by a first company can react correctly to a UE made by a second company if both support the AVPF standard. This may be advantageous for IMS and VT adaptations to allow users to make call across carriers and using devices with different manufacturers.

Rate-Adaptation for Transition Period

In an aspect of the disclosure, the modem information 318 may be utilized by the VT device 105 to determine when a transition from a first RAT 115 to a second RAT 120 is beginning and/or ending. For example, modem information 318 may indicate events related to a transition period. This information may, for example, be based on the AVPF standard and may include events, signaling information, etc. For example, the modem 306 may provide a signal to indicate that a network transition has started and another signal to indicate that the transition has succeeded or failed. The UE may use the information to change the behavior of VT calls. However, while the modem 306 may be described in this disclosure as providing such information, this is only exemplary and the information can be received from other sources. For example, a user may provide input to indicate when a transition is about to occur. Moreover, while the information may be described as being based on AVPF (which is currently used and supported in various markets such as the United States, Japan, and China), other standards may also be used and are contemplated. Moreover, modem information 318 may also include other types of information, including buffer fullness, signal strength, available uplink/downlink bandwidth at modem layer, etc.

Many devices use rate-adaptation to adjust bit rate based on signal strength and network conditions. For example, if a signal is poor and/or channel conditions are bad, a device may lower its bit rate so as to display video at a lower resolution. During a transition between the first RAT 115 and the second RAT 120 (e.g., LTE and Wi-Fi), signal strength and/or channel conditions drop temporarily while the device establishes a new connection. Because the loss of signal strength during the transition is only temporary, the device may not need to adjust its bit rate based on the loss as it can be expected that the strength will increase when the transition is complete. Thus, the device may be configured to refrain from recording signal information during transition periods and/or adjust bit rate or other parameters during the transition from the first RAT to the second RAT, which avoids an overreaction to a temporary reduction in video quality during the transition of one RAT to another.

In an embodiment, a modem of 306 of a device 105 may be used to detect one or more RATs. In some instances, the modem 306 may initiate a transition from one of the RATs to a second RAT. At the beginning of the transition, the modem 306 may provide modem information 318 to a VT application 304 indicative of the start of the transition. For example, the device 105 may use modem information 318 from the data layer when the device is moving from LTE to Wi-Fi or vice versa. Such information from the data layer could include indicating 1) when a possible handover is starting and/or 2) whether the handover was successful or failed to complete. While the information is described as being received from the modem 306, such information can instead be received from other sources, such as another device 105' or a user. By tracking the handover period, the device can know when to stop tracking signal strength information and/or which information to ignore. The device can also delete historical information created during the transition period or clear historical information completely after the transition period.

In one aspect, a device 105 may use transition (i.e., handover) information to modify response to and/or transmission of a Temporary Maximum Media Stream Bit Rate Request (TMMBR, "timber"). TMMBR is a signaling method used in AVPF that allows a device to communicate to another device a need to change an encoding bit rate. A receiver, translator, or mixer uses the TMMBR to request a sender to limit the maximum bit rate for a media to, or below, the provided value. Such requests, when issued during a transition period, may be responsive to a temporary poor channel condition during the transition period. For example, if a device detects a bad channel condition, it may send a TMMBR value with 200 kbps to indicate to another device a need to change the encoding bit rate to approximately 200 kbps. The device 105 may then block and/or ignore a received TMMBR and/or other bit rate requests during the transition period. The device 105 may also refrain from transmitting and/or block transmission of a TMMBR during such period.

One embodiment may involve adjusting bit rate based on an expected increase or decrease in signal strength, channel conditions, etc. after a transition period. For example, if a device currently using LTE begins a transition to a known Wi-Fi network with good signal strength (e.g., a home network), the device may attempt to adjust its bit rate to a level that corresponds to the Wi-Fi network even before the transition is complete. This may involve sending a TMMBR value that corresponds to the network the device is transitioning to.

Another embodiment may involve transmitting a request to clear data associated with a first RAT after a transition from the first RAT has been indicated and/or after a successful transition has been indicated. For example, the device 105 may, after receiving an indication of a transition from a first RAT, issue a request to a data store and/or a device in communication with a data store to clear data indicative of signal strength and/or channel conditions during communication over the first RAT. The data store may be a component of the device 105 or may be an external device.

Figure 4:
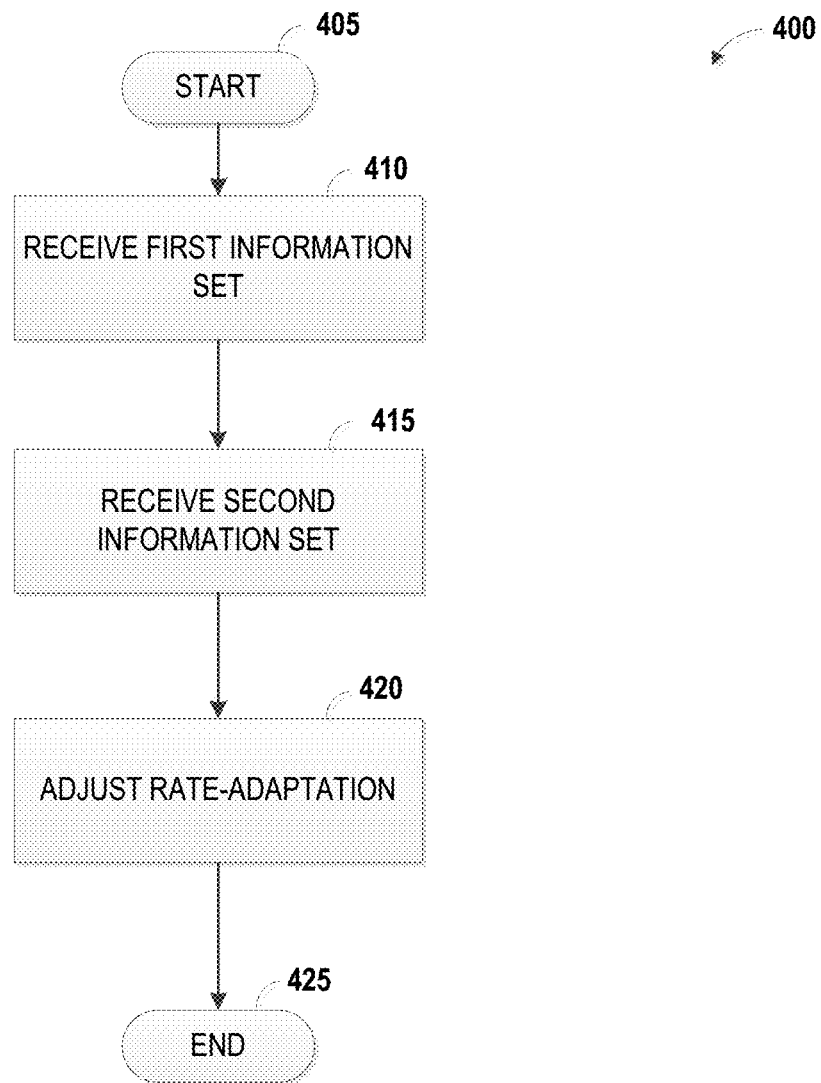
FIG. 4 is a flowchart showing an exemplary method for rate-adaptation in VT according to techniques of this disclosure.

FIG. 4 is a flowchart showing an exemplary method/process 400 for rate-adaptation in VT according to one or more aspects of the present disclosure. The process 400 may be performed by, for example, the VT device in FIGS. 1-3, or component(s) thereof. The process 400 starts at block 405. At block 410, the process 400 may involve receiving a first information set. For example, a VT device 105 may receive the first information set from the modem 306. In other embodiments, the first information set may be received from other sources, such as an external device 105'. The first information set may be indicative of transition information. For example, the first information set may include information indicating a start of a transition from a first RAT 115 to a second RAT 120. In other embodiments, the VT device 105 may receive input from a user which may be indicative of transition information.

At block 415, the process 400 may involve receiving a second information set. For example, the first information set may comprise information indicative of the start of a transition period and the second information set may comprise information indicative of the end of the transition period. In another embodiment, the first and second information sets may comprise one information set.

At block 420, the process 400 may involve adjusting the rate-adaptation protocol. For example, the process 400 may involve refraining from performing rate-adaptation during the transition period. In an embodiment, this may involve blocking outgoing and/or incoming information (e.g., a TMMBR value). In another embodiment, the device 105 may refrain from responding to received information. For example, the device 105 may receive information indicating poor channel conditions during the transition period. However, the device 105 may not respond to such channel information if received during a transition period. The process 400 ends at block 425.

In an embodiment, the process 400 may involve multiple adjustments to the rate-adaptation protocol. For example, the process 400 may involve adjusting rate-adaptation a first time after receiving the first set of information and adjusting rate-adaptation a second time after receiving the second set of information. This is because different adjustments may be beneficial for different types of information. For example, in response to receiving the first set of information indicating a start of a handover, a VT device may block and/or ignore TMMBR values and/or other bit rate requests, as such requests may be unnecessarily responsive to the handover. As another example, in response to receiving a second set of information indicating an end of a handover, a VT device may issue a TMMBR value, as the transition to a different RAT may make an updated TMMBR value beneficial.

In another embodiment, more than two information sets may be received. For example, an information set may indicate that a handover period is ongoing. Another information set may indicate whether the transition was successful.

Figure 5:
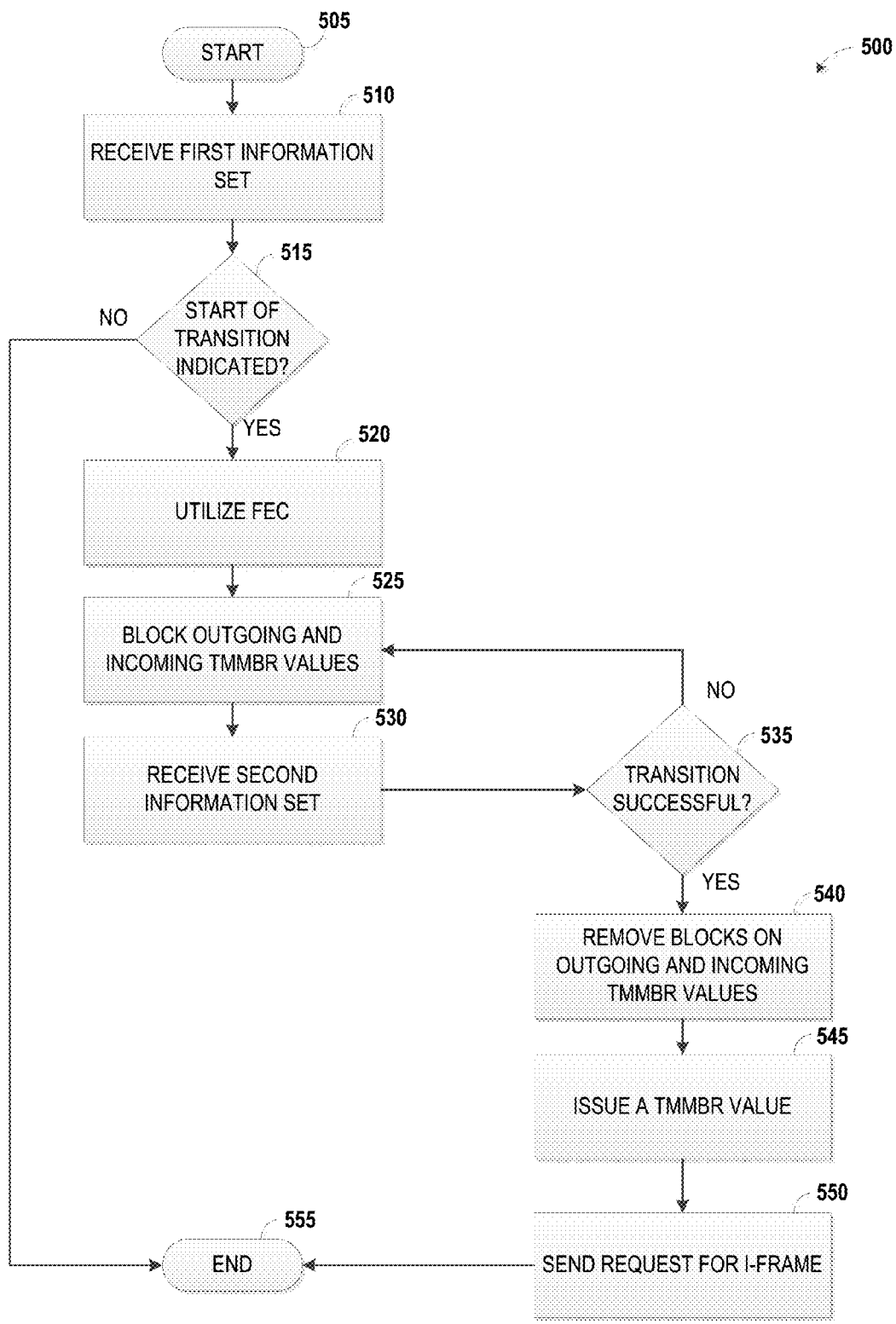
FIG. 5 is flowchart showing another exemplary method for rate-adaptation in VT according to techniques of this disclosure.

FIG. 5 is flowchart showing another exemplary method for rate-adaptation in VT according to one or more aspects of the present disclosure. The process 500 starts at block 505. At block 510, the process 500 may involve receiving a first set of information. The first set of information may be indicative of a start of a handover from a first RAT to a second RAT.

At decision block 515, the process 500 may involve determining whether a start a transition period was indicated in the first information set. If a start of a transition period was indicated, the process 500 may continue to block 520. If a start of a transition period was not indicated, the process 500 may continue to block 555. Transition period information may be useful in determining actions that may be performed to adjust rate-adaptation. As discussed above, it may be beneficial to adjust and/or refrain from performing rate-adaptation during a transition period because transition periods are often temporary and are often not indicative of near-future channel conditions.

At block 520, the process 500 may involve utilizing Forward Error Correction (FEC) to control errors in data transmission, as packet loss may be expected due to the transition. For example, FEC may be applied for audio RTP messages or any other important multimedia information that may benefit from extra protection At block 525, the process 500 may involve blocking outgoing and/or incoming TMMBR values. For example, the process 500 may involve blocking outgoing and/or incoming TMMBR values during the transition period. In alternative embodiments, rather than blocking and/or ignoring incoming TMMBR values, the process 500 may involve setting a video encoder to a bit rate value that was available before the transition period started. Alternatively, the video encoder may be set to a maximum bit rate value. For example, the maximum bit rate value may be set by preference and/or via a Session Description Protocol (SDP) offer/response.

At block 530, the process 500 may involve receiving a second set of information. For example, the first set of information may comprise information indicative of the start of a transition period and the second set of information may comprise information indicative of the end of the transition period. In another embodiment, a single information set may be received.

At decision block 535, the process 500 may involve determining whether the transition was successful. For example, the second information set may indicate whether the VT connection was successfully transferred from the first RAT 115 to the second RAT 120. In one example, an indication of an end of a transition period may be equivalent to an indication of a successful transition. If the transition was successful, the process 500 may involve continuing to block 540. If the transition period has not ended, the process 500 may involve returning to block 525.

At block 540, the process 500 may involve discontinuing blocking of outgoing and/or incoming TIMMBR values. At block 545, the process 500 may further involve issuing a TMMBR value. The TMMBR value may be indicative of a maximum allowable bit rate. In another embodiment, the process 500 may involve waiting a period of time (e.g., 1 Round-Trip Time (RTT)) and re-issuing the TMMBR value.

At block 550, the process 500 may involve transmitting a request for an I-frame (i.e., I-picture). For example, the request may be a Picture Loss Indication (PLI) message. The PLI message is included in AVPF. The process 500 ends at block 555.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM, synchronous dynamic random access memory (SDRAM), ROM, NVRAM, EEPROM, FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

A processor in communication with (e.g., operating in collaboration with) the computer-readable medium (e.g., memory or other data storage device) may execute the instructions of the program code may be executed by a processor, which may include one or more processors, such as one or more DSPs, general purpose microprocessors, ASICs, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a CODEC. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for rate-adaptation of a video telephony (VT) session, comprising:
   receiving a first information set indicative of a start of a handover of a device from a first Radio Access Technology (RAT) to a second RAT;
   receiving a second information set indicative of an end of the handover; and
   adjusting a rate-adaptation protocol for the VT session based at least in part on the first and second information sets.

2. The method of claim 1, wherein adjusting the rate-adaptation protocol comprises refraining from performing rate-adaptation between the start and end of the handover.

3. The method of claim 1, wherein adjusting the rate-adaptation protocol comprises blocking a bit rate request from the device between the start and end of the handover.

4. The method of claim 3, wherein the bit rate request comprises Temporary Maximum Media Stream Bit Rate Request (TMMBR) values.

5. The method of claim 1, further comprising ignoring an incoming bit rate request between the start and end of the handover.

6. The method of claim 5, wherein the bit rate request comprises TMMBR values.

7. The method of claim 1, further comprising, between the start and end of the handover, transmitting a bit rate request comprising a value corresponding to expected signal strength or channel conditions of the second RAT.

8. The method of claim 1, further comprising, after the end of the handover, transmitting a request to clear data associated with the first RAT.

9. The method of claim 1, further comprising activating Forward Error Correction (FEC) at the start of the handover.

10. The method of claim 1, further comprising, between the start and end of the handover, setting a video encoder of the device to a bit rate value received before the start of the handover.

11. The method of claim 1, further comprising issuing a TMMBR value at the end of the handover.

12. The method of claim 11, further comprising repeating the TMMBR value after a period of time.

13. The method of claim 1, further comprising transmitting a request for an I-frame at the end of the handover.

14. The method of claim 1, wherein the first and second sets of information are indicated in a data layer of a modem.

15. The method of claim 1, wherein the first RAT is a Long-Term Evolution (LTE) network and the second RAT is a Wi-Fi network.

16. An apparatus for rate-adaptation of a video telephony (VT) session, comprising:
a receiver configured to:
receive a first information set indicative of a start of a handover of a device from a first Radio Access Technology (RAT) to a second RAT; and
receive a second information set indicative of an end of the handover; and
a processor configured to adjust a rate-adaptation protocol for the VT session based at least in part on the first and second information sets.

17. The apparatus of claim 16, wherein the processor is configured to adjust the rate-adaptation protocol via refraining from performing rate-adaptation between the start and end of the handover.

18. The apparatus of claim 16, wherein the processor is configured to adjust the rate-adaptation protocol via blocking a bit rate request from the device between the start and end of the handover.

19. The apparatus of claim 16, wherein the processor is configured to adjust the rate-adaptation protocol via ignoring an incoming bit rate request between the start and end of the handover.

20. The apparatus of claim 19, wherein the bit rate request comprises TMMBR values.

21. The apparatus of claim 16, wherein the processor is further configured to, between the start and end of the handover, adjust the rate-adaptation protocol via transmitting a bit rate request comprising a value corresponding to expected signal strength or channel conditions of the second RAT.

22. The apparatus of claim 16, wherein the processor is further configured to, after the end of the handover, transmit a request to clear data associated with the first RAT.

23. The apparatus of claim 16, wherein the processor is further configured to, between the start and end of the handover, set a video encoder of the device to a bit rate value received before the start of the handover.

24. The apparatus of claim 16, wherein the processor is further configured to adjust the rate-adaptation protocol via issuing a TMMBR value at the end of the handover.

25. A non-transitory computer readable storage medium having stored thereon instructions that, when executed, cause a processor of a device to:
receive, during a video telephony (VT) session, a first information set indicative of a start of a handover of a device capable of performing VT from a first Radio Access Technology (RAT) to a second RAT;
receive a second information set indicative of an end of the handover; and
adjust a rate-adaptation protocol for the VT session based at least in part on the first and second information sets.

26. The non-transitory computer readable storage medium of claim 25, wherein adjusting the rate-adaptation protocol comprises refraining from performing rate-adaptation between the start and end of the handover.

27. The non-transitory computer readable storage medium of claim 25, wherein adjusting the rate-adaptation protocol comprises blocking a bit rate request from the device between the start and end of the handover.

28. A video coding device for rate-adaptation of a video telephony (VT) session, comprising:
means for receiving a first information set indicative of a start of a handover of the device from a first Radio Access Technology (RAT) to a second RAT;
means for receiving a second information set indicative of an end of the handover; and
means for adjusting a rate-adaptation protocol for the VT session based at least in part on the first and second information sets.

29. The video coding device of claim 28, wherein adjusting the rate-adaptation protocol comprises refraining from performing rate-adaptation between the start and end of the handover.

30. The video coding device of claim 28, wherein adjusting the rate-adaptation protocol comprises blocking a bit rate request from the device between the start and end of the handover.

* * * * *